US008620256B2

(12) United States Patent
Stählin et al.

(10) Patent No.: US 8,620,256 B2
(45) Date of Patent: Dec. 31, 2013

(54) AUTOMATED VOICE EMERGENCY CALL

(75) Inventors: Ulrich Stählin, Eschborn (DE); Peter Rieth, Eltville (DE)

(73) Assignee: Continental Teves AG & Co. oHG (DE)

( * ) Notice: Subject to any disclaimer, the term of this patent is extended or adjusted under 35 U.S.C. 154(b) by 873 days.

(21) Appl. No.: 12/593,494

(22) PCT Filed: Mar. 27, 2008

(86) PCT No.: PCT/EP2008/053624
§ 371 (c)(1), (2), (4) Date: Sep. 28, 2009

(87) PCT Pub. No.: WO2008/119729
PCT Pub. Date: Oct. 9, 2008

(65) Prior Publication Data

US 2010/0130161 A1 May 27, 2010

(30) Foreign Application Priority Data

Mar. 29, 2007 (DE) ......................... 10 2007 015 586
Mar. 27, 2008 (DE) ......................... 10 2008 016 226

(51) Int. Cl.
*H04M 11/04* (2006.01)

(52) U.S. Cl.
USPC .................................... 455/404.1; 455/414.4

(58) Field of Classification Search
USPC ........................................... 455/404.1, 414.4
See application file for complete search history.

(56) References Cited

U.S. PATENT DOCUMENTS

| | | | | |
|---|---|---|---|---|
| 5,764,736 | A * | 6/1998 | Shachar et al. | 379/93.09 |
| 6,324,393 | B1 * | 11/2001 | Doshay | 455/404.2 |
| 6,339,370 | B1 | 1/2002 | Rühl et al. | |
| 6,573,831 | B2 | 6/2003 | Ikeda et al. | |
| 6,574,463 | B1 * | 6/2003 | Yoshioka | 455/404.2 |
| 6,617,979 | B2 | 9/2003 | Yoshioka | |
| 6,618,657 | B1 | 9/2003 | Geil et al. | |
| 6,690,681 | B1 * | 2/2004 | Preston et al. | 370/493 |
| 7,076,236 | B2 | 7/2006 | Ihira et al. | |
| 7,580,697 | B2 | 8/2009 | Lappe et al. | |
| 7,738,509 | B2 * | 6/2010 | Piwowarski et al. | 370/529 |
| 2003/0016147 | A1 | 1/2003 | Evans | |
| 2005/0282518 | A1 * | 12/2005 | D'Evelyn et al. | 455/404.1 |
| 2007/0142026 | A1 * | 6/2007 | Kuz et al. | 455/404.1 |

FOREIGN PATENT DOCUMENTS

| | | | |
|---|---|---|---|
| DE | 43 21 416 | A1 | 1/1995 |
| DE | 299 11 590 | U1 | 2/2000 |
| DE | 198 49 846 | A1 | 6/2000 |
| DE | 199 17 202 | C2 | 10/2000 |
| DE | 199 22 730 | A1 | 11/2000 |
| DE | 101 37 670 | A1 | 4/2002 |

(Continued)

OTHER PUBLICATIONS

Wada et al, System and Device for Emergency Vehicle Report, Oct. 15, 1999, Matsushita Electric Ind. Co. Ltd, JP 11-283158, Machine Translation from Japanese to English.*

*Primary Examiner* — Liton Miah
(74) *Attorney, Agent, or Firm* — RatnerPrestia

(57) ABSTRACT

A data channel for the transmission of voice from a subscriber and of additional data characterizing the cause of an accident is used for an emergency call from a vehicle. These characterizing data are likewise transmitted in the form of voice. The data transmission is effected sequentially in this case.

19 Claims, 2 Drawing Sheets

(56) References Cited

FOREIGN PATENT DOCUMENTS

| | | | | | |
|---|---|---|---|---|---|
| EP | 1 280 120 | A1 | | 1/2003 | |
| EP | 1 372 324 | A2 | | 12/2003 | |
| JP | 11283158 | A | * | 10/1999 | ............. G08B 25/08 |
| JP | 2000-242892 | | | 9/2000 | |
| WO | WO 03/042943 | A2 | | 5/2003 | |

* cited by examiner

AUTOMATED VOICE EMERGENCY CALL

CROSS REFERENCE TO RELATED APPLICATIONS

This application is a U.S. national phase application of PCT International Application No. PCT/EP2008/053624, filed Mar. 27, 2008, which claims priority to German Patent Application No. 10 2007 015 586.9, filed Mar. 29, 2007 and German Patent Application No. 10 2008 016 226.4, filed Mar. 27, 2008, the contents of such applications being incorporated by reference herein.

BACKGROUND OF THE INVENTION

1. Field of the Invention

The invention relates to safety and rescue systems. In particular, the invention relates to an emergency call device for a vehicle, an emergency call system, the use of an emergency call device in a vehicle, a method, a computer program product and a computer-readable medium.

2. Description of the Related Art

Vehicle emergency radio systems have been known for a long time. By way of example, DE 43 21 416 A1 discloses a vehicle emergency radio system which is based on the vehicle emergency radio system in the demonstrations project ARTHUR from 1989. To allow the position of the vehicle which has had an accident to be found regardless of the radio-related constraints, for example radio-related shadow effects in tunnels, at the location of the accident, provision is made a) for the position-finding device to automatically ascertain the present position of the vehicle during the (entire) operating phase of the vehicle continuously, preferably at prescribed intervals of time, and to transfer the ascertained position data to the emergency transmitter, and b) for the position data to remain stored in the emergency transmitter until new position data are received from the position-finding device.

In the event of an accident, the crash sensor (e.g. the airbag sensor) connected to a control unit (which is connected to a position-finding device and to an emergency transmitter, e.g. in the form of an appropriately modified car telephone) uses prescribed accident criteria to check whether or not an emergency signal needs to be sent. If the criteria are met, the crash sensor uses the control unit to send an enable signal to the emergency transmitter, which then uses the second antenna to send an emergency signal by radio together with the currently stored position data for the vehicle 1. In addition, it is possible for the crash sensor, upon the accident criteria being met, to prompt fresh determination of the vehicle position by the position-finding device and for these position data to be sent by the emergency transmitter together with the emergency signal. Finally, it is possible to use a travel pilot for position finding instead of a GPS device (Global Positioning System).

An emergency reporting apparatus which can recognize a plurality of signal formats, so that it can be installed generally in vehicles or models with different signal formats for the signals from an airbag device, is known from DE 101 37 670 A1. In this case, the airbag device is connected to a control unit and is activated by means of a LAN signal line, when a vehicle LAN bus line is used, or by means of a direct line which is not a LAN signal line when a vehicle without a vehicle LAN is involved. The airbag device outputs a status signal in order to identify whether a LAN connection or a direct line connection is involved.

In this case, the control unit provides the following functions:

1) An emergency call request is recognized from an operation signal from an emergency reporting key, an airbag deployment signal which is output by the airbag device in the event of a collision or accident, or an automatic emergency reporting signal on the basis of a fuel interruption signal.

2) The emergency reporting process is started by reading position information and other data from a memory unit.

3) The telephone number stored in the memory unit for the control center, such as for the police or for a rescue center which monitors the emergency reporting system, is read.

4) A telephone call is requested from the emergency reporting unit using this telephone number.

5) The transition to the conversation state is recognized when a response signal from the party corresponding to the telephone number or a signal which changes to the conversation state, such as a call connected signal, is received.

6) Position information and course data, which have been obtained from the position information capture/processing unit, and also the control center call signal are sent to the emergency reporting unit via the base station of the communication device.

In addition, DE 299 11 590 U1 discloses an apparatus which is permanently installed in a car and triggers from the airbag and sensors. The apparatus comprises a digital handsfree telephone—programd only for emergency calls—in a housing which, by virtue of its design, is suitable for installation in the internal lining of the car roof, and control lines to the external on/off switches, for example airbag or sensors. The emergency call is made automatically when one of the airbags or sensors in the car is triggered or the emergency call is triggered manually by means of a pushbutton switch or by further sensors installed in the vehicle. Preferably, the apparatus is accommodated centrally between the front and rear seats under the roof of the car.

A further emergency call device for vehicles which sends an emergency message to a rescue control center in the event of an accident ascertained by sensors in the vehicle, wherein the emergency message contains suitable information for the initiation of assistance measures, is known from DE 199 17 207 C2. To ensure that an emergency message is sent to a rescue control center even if the onboard electronics of the vehicle are destroyed by the accident, provision is made for the emergency call device to send a first message containing at least the geographical vehicle position in a critical driving situation ascertained by the sensors before an accident has actually occurred. If the critical driving situation subsequently does not result in an accident, the rescue control center is informed of the first message having lapsed by means of a second message, which is sent after a prescribed period of time has elapsed after the first message. The sensors can capture translational accelerations and/or angle-of-rotation accelerations by the vehicle and/or changes in the shape of the vehicle bodywork and/or braking processes and/or steering movements. An evaluation unit takes the sensor signals and uses threshold value decisions to infer whether a critical driving situation is present and whether an accident has arisen from a critical driving situation. The second message then contains information about the vehicle registration and/or the vehicle type and/or the severity of the accident and/or the number of vehicle occupants and/or acute illnesses in the vehicle occupants. After the second message, at least one further message can also be sent which contains further information about the course of events in the accident and/or the situation of the affected vehicle occupants.

A similar emergency call system with a transmitter/mobile telephone provided in the motor vehicle for the automatic transmission of an emergency call to an external receiving station and with at least one signal generator, wherein the transmitter and the signal generator are connected to a computation unit which activates the emergency call if there is an appropriate signal from the signal generator, is known from DE 199 22 730 A1. The emergency call system contains means for determining a degree of probability of an imminent accident with the signals from the signal generator, and the emergency call (together with the position ascertained by means of GPS navigation or compound navigation or by beacons at the edge of the road) can be activated when a limit value for the degree of probability is exceeded. In particular, the emergency call system contains, as a signal generator, measuring means connected to the computation unit for determining the relative speed and the distance of the vehicle from another vehicle or from an obstacle (radar system, infrared system), the computation unit being able to perform a comparison between the relative speed determined by means of the radar system and a maximum admissible value for the relative speed at the measured distance. The emergency call can therefore actually be activated before the accident if the maximum admissible relative speeds at a given distance are exceeded. However, it is also possible to store a plurality of pairs of values for a distance and for an associated maximum admissible relative speed in a memory and to determine the maximum admissible relative speed, including on the basis of the state of the road (optical sensors), by means of interpolation for example. In order to prevent false alarms, the computation unit is connected to at least one sensor for detecting an accident, particularly to an acceleration sensor on the airbag or to a temperature sensor (vehicle fire). The emergency call system also contains a timer which is connected to the computation unit and which is started when the emergency call is activated. If there is no signal signaling a collision from the sensor at the time at which the timer expires, the emergency call is automatically cancelled by means of the mobile telephone or the transmitter.

So as still to be able to safely send an emergency call using a radio telephone even in the event of a severe impact or collision of a vehicle, it is known practice from WO 03/042943 A2 to arrange an autarkic emergency call unit at a location in the vehicle which is particularly protected against damage through collision or impact. To this end, the emergency call unit is equipped with a dedicated battery, with a GSM transceiver and with a transmission and reception unit for setting up a short radio link to the radio telephone, and when an emergency call is triggered, the emergency call unit sends an emergency call via the short radio link to the radio telephone, which forwards the emergency call to an emergency control center by radio. Since the emergency call unit is not connected to the radio telephone by cable—electrical or optical fibers—but rather by means of a radio link, it is not possible for the situation to arise in which a collision causes the cables to be destroyed and the sending of an emergency call therefore to be rendered impossible. The radio transmission of an emergency call from the emergency call unit to the radio telephone is effected on the basis of the Bluetooth standard. An emergency call can be triggered by the trigger signal from an airbag, for example, as in the case of known emergency call devices. In addition, the emergency call unit may contain a sensor which detects a collision and immediately prompts the sending of an emergency call.

By way of example, the sensor provided may be a gyroscope which prompts the triggering of an emergency call from the emergency call device to the radio telephone not by means of electrical signals but rather in mechanical fashion. Since the gyroscope reacts right at the start of a collision, an emergency call is actually sent before the radio telephone is damaged or destroyed. The short time between the detection of a collision by the gyroscope and possible damage or destruction of the radio telephone by an impact suffices to allow the Bluetooth link to be used still to transmit all data which are relevant to the accident. If this time is no longer sufficient for sending an emergency call, the GSM transceiver in the emergency call device sends an emergency call.

Another option is for a commercially available radio telephone to be prepared to receive the emergency calls sent by the emergency call unit and to forward them to an emergency control center or for the user to use the mobile telephone to activate the emergency call unit and to trigger an emergency call. In this case, the mobile telephone acts more or less as a remote control for the emergency call unit.

In addition, portable emergency transmitters which can be activated by the user by pressing a key have been known for a long time. To send an emergency call within a few seconds without pressing keys using a portable mobile telephone or an emergency transmitter incorporated in a wristwatch, brooch or bracelet, it is known from DE 198 49 846 A1 that said mobile telephone/emergency transmitter has a voice recognition program, that at least one emergency telephone number is permanently stored and that input/recognition of a particular word prompts the emergency telephone number to be dialed automatically. In addition, the mobile telephone/emergency transmitter may be equipped with a pulse generator for finding the current position.

A mobile telephone/emergency transmitter which is known from EP 1 372 324 A2 is designed in a similar manner. In one embodiment described therein, various previously stored keywords are evaluated—in silent alarm mode—and recognition of one of the keywords prompts an emergency message to be sent to a rescue control center/police station via the mobile radio network.

Finally, U.S. Pat. No. 6,573,831 B2 discloses a monitoring apparatus in the vehicle in which a microphone is used to continuously pick up and store sounds in the area of the vehicle so as to be able to evaluate them after any accident which has occurred. The sounds captured by means of the microphone are themselves not used to trigger an emergency call in the vehicle, however.

As shown by the above acknowledgement of the prior art, differently designed vehicle emergency radio systems with or without position-finding or determination of a degree of probability of an imminent accident are known. Usually, it is necessary for the mobile telephone to be integrated into the vehicle electronics or to be coupled thereto by means of interfaces, or two radio telephones are necessary, as in the case of the subject matter of WO 03/042943 A2.

In addition, extensive precautions need to be taken with regard to unintentional trigger processes for an emergency call. Triggering using stored keywords on a mobile telephone/emergency transmitter carried by the user also fails if the road user is himself unable to do this after an accident. Therefore, what is missing in practice is a vehicle emergency radio system which can be used universally regardless of other technical circumstances and which triggers an emergency call automatically in the event of an accident.

SUMMARY OF THE INVENTION

It is an object of the invention to provide improved automation of emergency calls.

The invention specifies an emergency call device, an emergency call system, a use, a method, a computer program product and a computer-readable medium.

The exemplary embodiments described relate equally to the device, the system, the use, the method, the computer program product and the computer-readable medium.

In line with one exemplary embodiment of the invention, an emergency call device for a vehicle for the transmission of an emergency call is specified, wherein the emergency call device has a detection unit for capturing measurement data, a control unit for converting data, corresponding to the captured measurement data, into a first piece of information by means of a media conversion, and a communication unit for transmitting an emergency call to a receiver. The emergency call comprises the first piece of information and a second piece of information. In this context, the second piece of information corresponds to an audible user input, such as for text spoken by a vehicle occupant.

In other words, the data can be transformed by means of the media conversion into voice or other formats (e.g. by means of text-to-speech, TTS) and then transmitted via an appropriate voice channel. In addition to the accident-specific, automatically transmitted data, it is also possible to transmit voice information from the user.

A data channel is thus provided for the transmission of the converted data from the subscriber and of other, additional data, which are automatically created by the system and which are used for accurate identification, e.g. of the accident location or the severity or type of the accident. The accident-specific data can likewise be transmitted in the form of voice.

Pure use of voice, for example, as a transmission medium means that no standardization of the data interface is necessary and also no change to the infrastructure. In this regard, the data are converted into voice by means of text-to-speech, and data which represents the normal voice of an occupant of the vehicle are buffered during the transmission, if required.

In line with a further exemplary embodiment of the invention, the communication unit is designed to transmit the first piece of information and the second piece of information in the same transmission channel.

Provision of a plurality of transmission channels is not necessary.

In line with the further exemplary embodiment of the invention, the communication unit and/or the control unit are designed to transmit the first piece of information and the second piece of information serially.

By way of example, the transmission of the (spoken) piece of second information can be interrupted if a first piece of information (corresponding to the captured measurement data) is ready for transmission or requested by a receiver.

In line with a further exemplary embodiment of the invention, the control unit has, for the purpose of converting the data into the first piece of information, a voice synthesizer which is designed to convert data by means of voice synthesis.

In line with a further exemplary embodiment of the invention, the communication unit and/or the control unit are designed to transmit the first piece of information directly after a connection has been set up and to transmit the second piece of information after the first piece of information has been transmitted.

In this way, the effect which can be achieved is that first of all the measurement data captured by the detection unit and converted by the control unit are transmitted to a control center or else a mobile receiver before the voice from the vehicle occupants is transmitted.

In line with a further exemplary embodiment of the invention, the communication unit and/or the control unit are designed to transmit the first piece of information if no voices can be heard from the vehicle over a prescribable period of time.

In other words, the accident-specific, measured information is sent, possibly yet again, no later than when the vehicle occupants are not providing any audible information themselves. In this way, timing gaps in the audible information stream from the occupants can be used to transmit the measurement data.

In line with a further exemplary embodiment of the invention, the communication unit and/or the control unit are designed to transmit only the first piece of information or only the second piece of information in response to a request from the receiver.

If the receiver sends a request to the communication unit stating that it requires the first information, the first information is sent. By contrast, if the receiver is interested in the second information, only the second information is sent. The receiver can thus determine what type of information it wishes to receive.

In line with a further exemplary embodiment of the invention, the communication unit and/or the control unit are designed to transmit the data in text form or to transmit the first piece of information in response to a request from the receiver.

If desired, the receiver can ask the emergency call device for text data so as to distribute said data to further receivers as an E-mail or SMS, for example.

It is also possible for the information from the emergency call device to be sent in the form of a video, for example together with audio data and/or text data.

In line with a further exemplary embodiment of the invention, the emergency call device also has an input unit with a buffer store for recording and buffer-storing the audible input from an occupant of the vehicle.

In line with the further exemplary embodiment of the invention, the receiver is a mobile terminal. The receiver may also be a rescue control center with a central server which is used to control a rescue operation centrally and largely automatically.

In line with a further exemplary embodiment of the invention, the receiver is a permanently installed NAD (Network Access Device).

In line with a further exemplary embodiment of the invention, the communication link for transmitting the voice information is a narrowband communication link.

In line with a further exemplary embodiment of the invention, the control unit is designed to evaluate the measured values, wherein the control unit can take the evaluation as a basis for deciding whether an accident has occurred, and wherein the voice information is transmitted only if the evaluation indicates that an accident has occurred.

By way of example, the evaluation and analysis of the measured values allows an automatic emergency call to be triggered. A user input is not required for this.

It is thus a simple matter to trigger an emergency call and to transmit the relevant data, even if the user is himself no longer able to transmit following an accident.

In line with a further exemplary embodiment of the invention, an emergency call system is specified which has an emergency call device as described above and a receiver for receiving the first piece of information and the second piece of information.

In line with a further exemplary embodiment of the invention, the receiver is designed to automatically make a return call when an emergency call is received if no further message from the occupant of the vehicle is received within a prescribed period of time, in which case the receiver initiates appropriate rescue measures. In this case, the emergency call unit is designed such that it can be called back and can accept this return call.

In line with a further exemplary embodiment of the invention, the use of an emergency call device as described above in a vehicle is specified.

In line with a further exemplary embodiment of the invention, a method for the transmission of an emergency call from a vehicle is specified, in which measurement data are captured, data corresponding to the captured measurement data are converted into a first piece of information by means of a media conversion, and an emergency call which has the first piece of information and a second piece of information is transmitted to a receiver, wherein the second piece of information corresponds to an audible user input.

In line with a further exemplary embodiment of the invention, a computer program product is specified which, when executed on a processor, prompts the processor to perform the method steps indicated above.

In line with a further exemplary embodiment of the invention, a computer-readable medium is specified which stores a computer program product which, when executed on the processor, prompts the processor to perform the method steps indicated above.

A fundamental consideration of the invention can be seen as being that data are converted into voice by means of text-to-speech and are then sent together with the voice from a vehicle occupant. The transformed, converted data and the voice from the occupant are sent serially in the same data channel.

BRIEF DESCRIPTION OF THE DRAWINGS

The text below describes exemplary embodiments of the invention which are preferred with reference to the figures.

The illustrations in the figures are schematic and not to scale.

DETAILED DESCRIPTION OF THE PREFERRED EMBODIMENT

In the description of the figures which follows, the same reference symbols are used for the same or similar elements.

Figure 1:
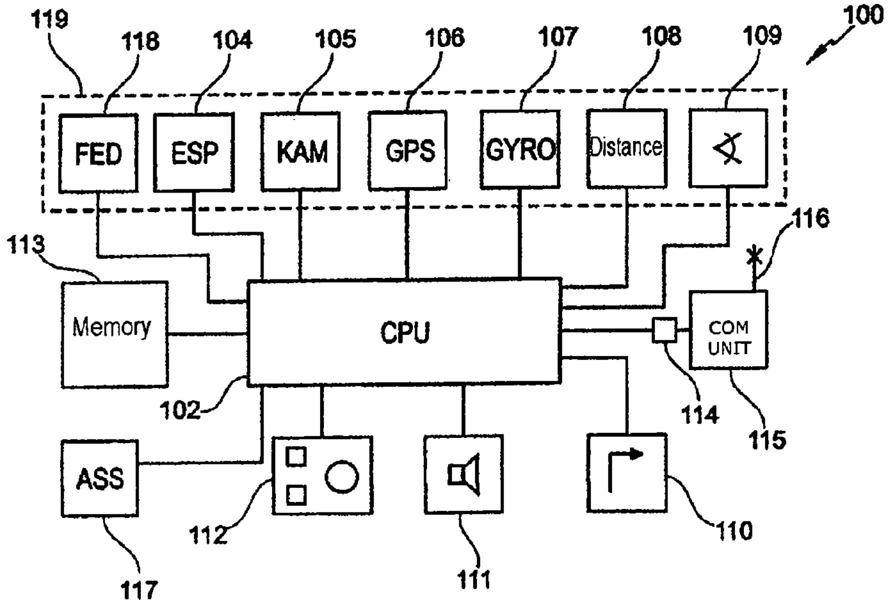
FIG. 1 shows a schematic illustration of an emergency call device based on an exemplary embodiment of the invention.

FIG. 1 shows a schematic illustration of components of an emergency call device for a vehicle for the transmission of an emergency call to appropriate receiving stations. The emergency call device 100 has, inter alia, a detection unit 119, a control unit 102, for example in the form of a CPU, and also a communication unit 115 with an antenna 116.

By way of example, the emergency call device 100 is installed in a vehicle. Alternatively, the emergency call device 100 may be a mobile system which can be carried by the user, that is to say is not permanently installed in the vehicle.

The emergency call device 100 has an input unit 112 which is connected to the control unit 102. By way of example, the input unit 112 is a controller which a user can use to make voice inputs.

In addition, the input unit 112 can be used to make various settings on the emergency call device 100 and to choose, by way of example, a destination and possibly also a location for a navigation unit. By way of example, the destination can be input by inputting the complete name of the location or else by selecting from a list which is shown on a visual output unit, such as a monitor 110. The monitor 110 also outputs the routing information. Furthermore, the routing information can also be output by means of an audible output unit 111. The output by means of the audible output unit 111 has the advantage that the driver is less distracted from a current traffic situation. A memory element or memory buffer 113 which is connected to the central control unit 102 stores map data (navigation map data) or digital map data in the form of data records. By way of example, the memory element 113 also stores additional information about traffic limitations and the like in association with the data records. A navigation appliance is not required in this case. The navigation capability is not a fundamental part of the system.

For the purpose of determining the current vehicle position, the emergency call device 100 has a navigation unit with a GPS receiver 106 which is designed to receive navigation signals from GPS satellites. Naturally, the navigation unit with the GPS receiver 106 may also be designed for other satellite navigation systems.

It should be pointed out that within the context of the present invention GPS is representative of all the global navigation satellite systems (GMSs), such as GPS, Galileo, GLONASS (Russia), Compass (China), or IRNSS (India).

It should also be pointed out that, by way of example, the vehicle is a motor vehicle, such as a car, bus or heavy goods vehicle, or else a rail vehicle, a ship, an aircraft, such as a helicopter or airplane, or a bicycle, for example.

Since the GPS signals cannot always be received in inner cities, the emergency call device 100 may also have, for the purpose of performing compound navigation, a direction sensor 107, a distance sensor 108 and a steering-wheel angle sensor 109. Possibly, spring travel sensors 118 and also an ESP system 104 and an optical detector 105, such as a camera, or a beam sensor, such as a radar, are also provided. These detectors are referred to as detection unit 119.

In addition, a driver assistance system 117 can be provided.

The communication unit has an electronics unit 115 and a transmission/reception antenna 116 for communication with a control center or with other transmitters/receivers. To provide data integrity and to prevent misuse, an encryption unit 114 can be provided which is connected between the control unit 102 and the communication unit 115, 116 and is used for encrypting the data which are to be sent and for decrypting the received data.

Figure 2:
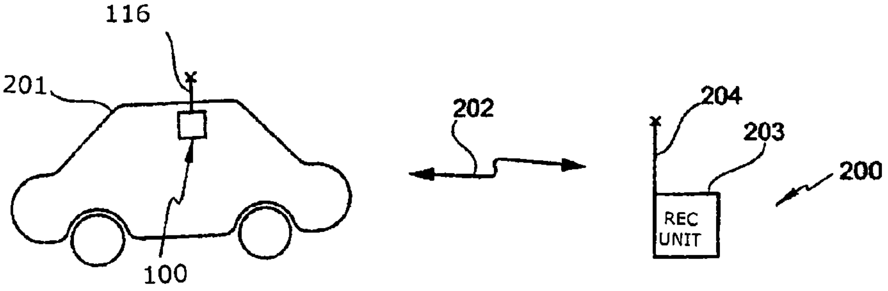
FIG. 2 shows a schematic illustration of an emergency call system based on an exemplary embodiment of the invention.

FIG. 2 shows a schematic illustration of an emergency call system based on an exemplary embodiment of the invention which has a vehicle 201, with an emergency call device 100, and a receiver 200.

The receiver 200 comprises a reception electronics unit 203 with an antenna 204 for receiving the information sent by the emergency call device 100. The information is sent via the data channel 202.

In the case of an automated emergency call (eCall), both data and voice are transmitted. By way of example, the data comprise the time of the accident, the position of the accident vehicle and the direction or the lane on which the accident occurred. In addition, data can be transmitted which indicate the severity of the accident, etc. These data are detected by the detection unit 119 (see FIG. 1) and are evaluated by the control unit 102, analyzed and, following appropriate conditioning, forwarded to the communication unit 115, 116.

Modulation of the (measurement) data onto the voice and subsequent isolation of the data and the voice at the receiving station are not required. It is also not necessary for the data to be sent by SMS.

The transmitter and receiver accordingly do not need to be in control of the same decoding technology.

In line with the invention, all the information is transmitted via a voice link only without the need for decoding. To this end, the data to be transmitted are transformed into voice by synthesizer (text-to-speech) and hence transmitted. During the data transmission, the voice from the vehicle is buffer-stored in a buffer (in a similar manner to time-delayed television, also called timeshift, in video recorders) so as not to lose any information.

For the transmission, there are a plurality of options which can be used alternatively. In the case of the first alternative, set up of the connection is followed immediately by the transmission of the data as voice and then by the transmission of the buffered voice.

In the case of the second alternative, the data are transmitted if no voices can be heard from the vehicle over a prescribed period of time. In this way, it is possible to use time intervals during which the occupants do not speak for the data transmission. By way of example, the data can be transmitted whenever the occupants are currently not speaking, which means that a certain redundancy is provided for the data transmission.

Following the conclusion of the call, the data are transmitted again.

In addition, there is also the option of the receiver himself being able to select whether voice or data are transmitted by using the keys on his telephone to remotely control the call and the transmission. This allows remote control of an eCall, similar to the functionality of a telephone answering machine.

This solution can be implemented either using a permanently installed NAD (Network Access Device) or using a mobile terminal which is connected to the vehicle by Bluetooth or comparable technology.

The media conversion, that is to say the pure use of voice as a transmission medium, means that there is no need for standardization of the data interface or a change to the infrastructure.

Figure 3:
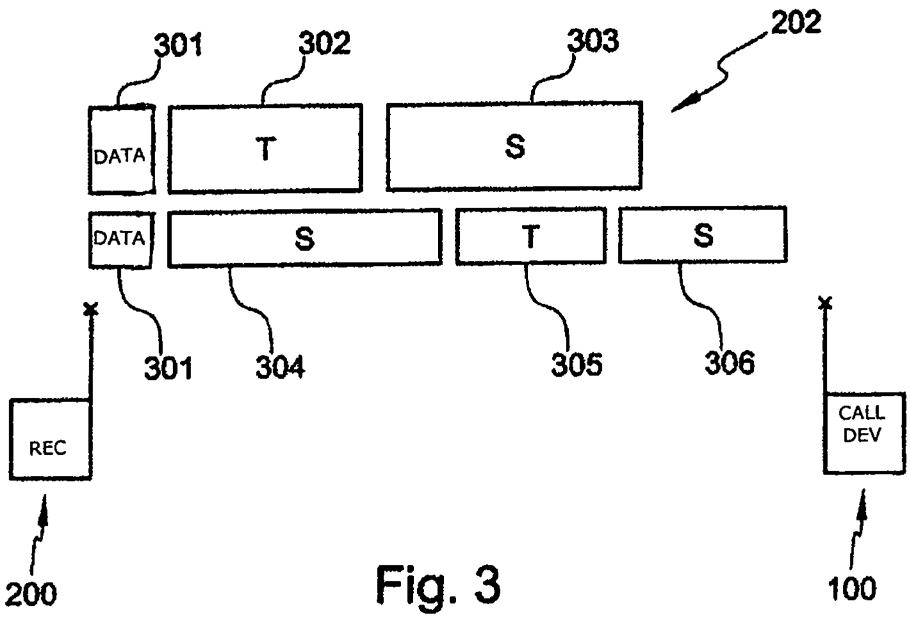
FIG. 3 shows a schematic illustration of possible transmission sequences based on an exemplary embodiment of the invention.

FIG. 3 shows a schematic illustration of possible transmission sequences for transmitting the first and second pieces of (voice) information from the communication unit of the emergency call device 100 to the control center 200.

When an accident is recognized by the emergency call device by virtue of the evaluation of the measurement data, a connection is set up between the emergency call device 100 and the control center 200, for example by sending an appropriate data packet 301 to the control center.

Next, in a first exemplary embodiment, the text data (that is to say the result of the analysis of the measurement data) converted into voice are transmitted as a data packet 302. Following this transmission, the voice information from the vehicle occupants is transmitted as a data packet 303. To provide the system with sufficient time to transmit the analysis result 302, the voice data can be buffer-stored in the emergency call device.

In another exemplary embodiment, voice data from the occupants are first of all transmitted as a data packet 304. During a break in speech, the analysis results are transmitted as a data packet 305. When these have been transmitted, further voice data from the occupants are transmitted as a data block 306, said voice data possibly having been buffer-stored in part until the transmission of the analysis results 305 is at an end.

The length of a requisite break in speech after which the transmission of the text data (in the form of voice) is started can be set by the user or by the control center 200.

Figure 4:
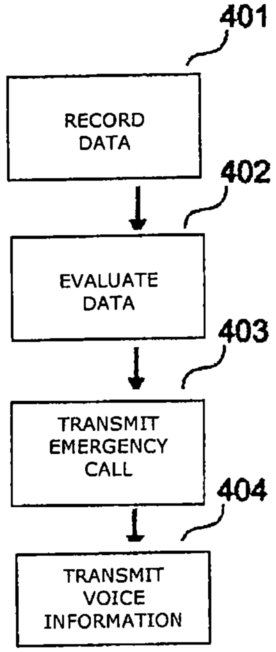
FIG. 4 shows a flowchart for a method based on an exemplary embodiment of the invention.

FIG. 4 shows a flowchart for a method based on an exemplary embodiment of the invention. The method is used for triggering and transmitting an emergency call from a vehicle in which, during the entire operating phase of the vehicle, means for detecting the cause of the emergency call being triggered are present. In step 401, measurement data are recorded, and in step 402, these measurement data are evaluated by the control device and analyzed to determine whether prescribable accident criteria are met. If these criteria are met, a transmitter connected to the control device sends an emergency call to an external receiving station in step 403.

The information which represents the cause of the emergency call being triggered is transmitted by the transmitter using a narrowband communication link, the information to be transmitted being transformed by means of a media conversion into time-limited voice information which is audible to a receiver. During this transmission, further voice information is recorded from the occupants in the vehicle by means of the vehicle-internal detection unit and is stored. This further voice information can then be transmitted in step 404 by means of the existing narrowband communication link following the transmission of the first piece of voice information.

It should additionally be pointed out that "comprising" and "having" do not exclude other elements or steps and "a" or "an" does not exclude a multiplicity. Furthermore, it should be pointed out that features or steps which have been described with reference to one of the above exemplary embodiments can also be used in combination with other features or steps in other exemplary embodiments described above.

The invention claimed is:

1. An emergency call device of a vehicle for the transmission of an emergency call during a voice connection, said emergency call device having:

a detection unit for capturing measurement data of the vehicle;

a speech detection unit for detecting an audible input of an occupant of the vehicle;

a control unit for converting the captured measurement data into a first voice signal by media conversion;

a communication unit for transmitting an emergency call, which includes the first voice signal and a second voice signal corresponding to the audible input of the occupant of the vehicle, to a receiver;

wherein the communication unit alternately transmits the first voice signal and the second voice signal during the voice connection so that the first voice signal is:

a) transmitted during the voice connection in response to the second voice signal not being detected by the speech detection unit, and b) buffered during the voice connection in response to the second voice signal being detected by the speech detection unit and transmitted by the communication unit.

2. The emergency call device as claimed in claim 1, wherein the communication unit is configured to transmit the first voice signal and the second voice signal in the same transmission channel.

3. The emergency call device as claimed in claim 1, wherein the communication unit and the control unit are configured to transmit the first voice signal and the second voice signal serially.

4. The emergency call device as claimed in claim 1,
wherein the control unit has a voice synthesizer which is configured to convert data by voice synthesis for the purpose of converting the data into the first voice signal.

5. The emergency call device as claimed in claim 1,
Wherein, after a connection has been established, the communication unit and the control unit are configured to transmit the first voice signal directly and to transmit the second voice signal after the first voice signal has been transmitted.

6. The emergency call device as claimed in claim 1,
wherein the communication unit and the control unit are configured to transmit the first voice signal if no voices can be heard from the vehicle over a prescribable period of time.

7. The emergency call device as claimed in claim 1,
wherein the communication unit and the control unit are configured to transmit only the first voice signal or only the second voice signal in response to a request from the receiver.

8. The emergency call device as claimed in claim 1,
wherein the communication unit and the control unit are configured to transmit the data in text form or to transmit the first voice signal in response to a request from the receiver.

9. The emergency call device as claimed in claim 1,
further comprising an input unit with a buffer store for recording and buffer-storing the audible user input from an occupant of the vehicle.

10. The emergency call device as claimed in claim 1,
wherein the receiver is a mobile terminal.

11. The emergency call device as claimed in claim 1,
wherein the receiver is a permanently installed network access device.

12. The emergency call device as claimed in claim 1,
wherein the communication link for transmitting the information is a narrowband communication link.

13. The emergency call device as claimed in claim 1,
wherein the control unit is configured to evaluate captured measurement data;
wherein the control unit can take the evaluation as a basis for deciding whether an accident has occurred;
wherein the information is transmitted only if the evaluation indicates that an accident has occurred.

14. The emergency call device as claimed in claim 1,
wherein converted data have at least one data type selected from the group consisting of text data, video data and audio data.

15. An emergency call system, having:
an emergency call device as claimed in claim 1; and
a receiver for receiving the first voice signal and the second voice signal.

16. The emergency call system as claimed in claim 15,
wherein the receiver is configured to automatically make a return call when an emergency call is received if no further message from the occupant of the vehicle is received within a prescribed period of time, in which case the receiver initiates rescue measures;
wherein the emergency call device is configured such that it can be called back and can accept a return call.

17. The use of an emergency call device as claimed in claim 1 in a vehicle.

18. A method for the transmission of an emergency call from a vehicle during a voice connection, said method comprising the steps of:
capturing measurement data of the vehicle;
detecting an audible input of an occupant of the vehicle;
converting the captured measurement data into a first voice signal by media conversion;
transmitting an emergency call including the first voice signal and a second voice signal corresponding to the audible input of the occupant of the vehicle to a receiver,
wherein the communication unit alternately transmits the first voice signal and the second voice signal during the voice connection so that the first voice signal is:
a) transmitted during the voice connection in response to the second voice signal not being detected, and
b) buffered during the voice connection in response to the second voice signal being detected and transmitted.

19. A non-transitory computer-readable medium which stores a computer program product which, when executed on a processor prompts the processor to perform the following steps:
capture measurement data of a vehicle;
detect an audible input of an occupant of the vehicle;
convert the captured measurement data into a first voice signal by media conversion;
transmit an emergency call during a voice connection, the emergency call including the first voice signal and a second voice signal corresponding to the audible input of the occupant of the vehicle to a receiver,
wherein the communication unit alternately transmits the first voice signal and the second voice signal during the voice connection so that the first voice signal is:
a) transmitted during the voice connection in response to the second voice signal not being detected, and
b) buffered during the voice connection in response to the second voice signal being detected and transmitted.

* * * * *